Jan. 31, 1961 R. J. WILLIAMS 2,970,303
NEON LAMP INDICATOR DEVICE
Filed March 4, 1955
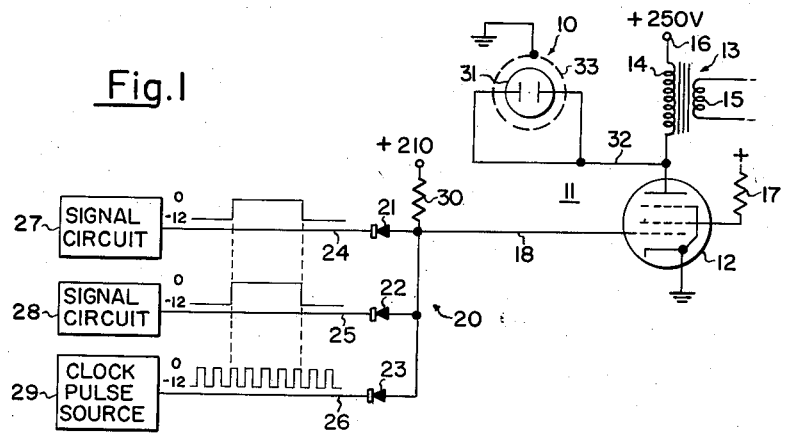
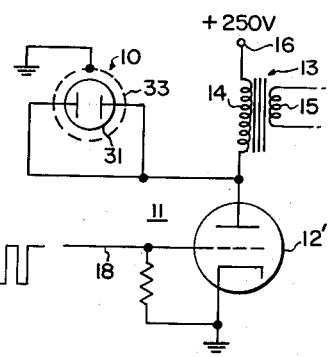
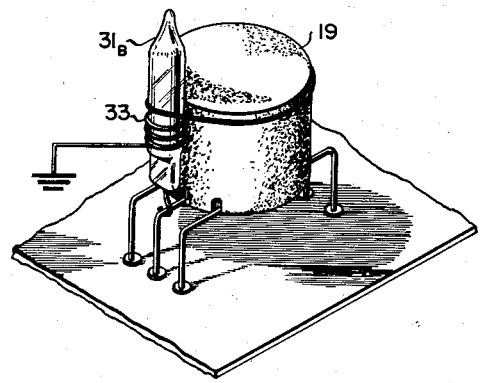
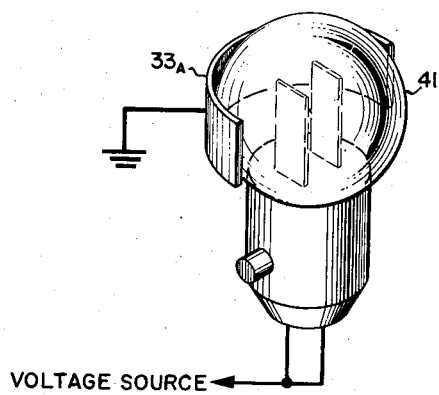
INVENTOR.
ROBERT J. WILLIAMS
BY
Thomas B. Horton
AGENT

United States Patent Office 2,970,303
Patented Jan. 31, 1961

2,970,303

NEON LAMP INDICATOR DEVICE

Robert J. Williams, Berwyn, Pa., assignor to Burroughs Corporation, Detroit, Mich., a corporation of Michigan Filed Mar. 4, 1955, Ser. No. 492,248

1 Claim. (Cl. 340—248)

This invention relates to indicating devices and more particularly to gas tube indicating devices.

Indicating devices using gas tubes exist for determining direct current signal conditions. Such devices also afford an indication of alternating current signal conditions. However, it has not heretofore been feasible to produce an acceptable gaseous tube indicator which discriminates between pulsating and D.-C. current. Such a device would find wide application in electronic computer circuitry since both D.-C. and pulsating signal conditions exist in logical systems used in such computers.

In such applications a single gaseous indicating device may be employed efficiently as taught by the present invention to show the operating condition of multiple circuits which heretofore have required more complex indication means.

Therefore, it is a general object of this invention to provide an improved and simplified indication system.

It is an object of this invention to provide a neon lamp indicator which discriminates between alternating and direct current signal conditions.

It is another object of this invention to provide a neon lamp indicator which is responsive to pulsating signals and adds no appreciable load to the circuit to which it is applied.

It is a further object of this invention to provide a simple and efficient indicator to show the operating condition of multiple circuits.

According to the invention, in order to indicate the presence of an A.-C. signal in a circuit having a pair of A.-C. terminals a neon lamp has at least one electrode within its glass envelope connected to one of the A.-C. terminals and another electrode external to and in close proximity to the envelope connected to the other A.-C. terminal. Because of capacitive coupling between the internal and external electrode, a varying electric field is built up between the electrodes in response to the application of the A.-C. signal, and the energy between the electrodes is sufficient to ionize the neon and cause the lamp to glow.

Other objects and advantages will become apparent when the following detailed description of the invention is read with reference to the accompanying drawings of which:

Fig. 1 is a gated pulse amplifier utilizing the neon lamp indicator of the invention to give visual indication of the operating condition of different conditions prevailing in the amplifier circuit;

Fig. 1a is a modification of the amplifier of Fig. 1; and,

Figs. 2 and 3 are neon indicators as used in accordance with the invention.

Referring to Fig. 1 a neon lamp indicating device 10 constructed in accordance with the invention is utilized to indicate several of the operating conditions within the overall logical system of the pulse amplifier 11. The pulse amplifier 11 is comprised of a pentode 12 connected to drive a transformer 13 having a primary winding 14 and a secondary winding 15. Accordingly, the anode of the pentode is connected to the lower end of the primary winding 14, and the upper end of the primary winding is connected to the terminal 16 of a source of anode potential, for example, +250 volts. The secondary winding 15 may be connected to any suitable load. In the usual manner, the screen grid is connected by a resistor 17 to a suitable positive potential. Finally, the cathode and suppressor grid are commonly connected to ground.

In order to provide the control grid of the pentode with operating potentials, the control grid is connected by a conductor 18 to a coincidence gate 20. The coincidence gate 20 is comprised of a plurality of diodes 21, 22, and 23 having their anodes commonly connected both to the conductor 18 and by a resistor 30 to a source of +210 volts. The cathode of the diode 21 is connected by conductor 24 to a first signal circuit 27, and the cathode of diode 24 is connected by conductor 25 to a second signal circuit 28. Finally, the cathode of diode 23 is connected by a conductor 26 to a source of periodic clock pulses 29.

Assume that each of the circuits 27 and 28 when "on" applies a zero volt potential to the corresponding conductor 24 or 25 and when "off" applies a —12 volt potential to the corresponding conductor 24 or 25. The periodic clock pulses which are applied to conductor 26 are narrow pulses rising from a quiescent level of —12 volts to a peak potential of zero volts. Thus, unless all three signals are at zero volts, the conductor 18 is at —12 volts to cut off tube 12.

In order for the coincidence gate 20 to apply a zero volt triggering potential to the control grid of pentode 12, to cause the tube to conduct, the potential at the cathodes of the three diodes 21, 22, and 23 must be at zero volts simultaneously.

Accordingly, when the first signal circuit 27 and the second signal circuit 28 are coincidently "on" whereby zero volt potentials are applied to the cathode of both diodes 21 and 22, each clock pulse is effective to apply a zero volt potential to the control grid of pentode 15 to effect alternate firing and quenching of the pentode at the clock pulse frequency. This produces an A.-C. signal at the transformer primary winding 14.

The neon indicator of the invention comprises an ordinary neon lamp 31 of the sort commercially available, for example, a type NE–2, having at least one of its internal electrodes connected by conductor 32 to the plate of the pentode 12. An external electrode 33 is provided closely adjacent to the lamp envelope and is connected to ground. Obviously the connections could be reversed, but operator safety requires that the external electrode not be at high voltage. As in Fig. 2, the external electrode may take the form of a conductive metallic shield 33$_A$ partially surrounding the glass envelope of the lamp 41 to permit a view of the ionized gas, and if desired shaped to clip about the envelope. Alternately, the external electrode may take the form of a few turns of wire 33 wrapped around the envelope of the tube and connected to ground as in Fig. 3. The mounting arrangement shown in Fig. 3 conveniently attaches the lamp to the transformer 13 by wrapping the ends of the wire turns about the casing 19.

When the anode voltage of pentode 12 is varied due to the pulsing of the control grid by the clock pulses, the potential of the internal electrode of the neon lamp is also varied. A capacitive coupling exists between the internal electrodes of the lamp 10 and the external electrode 33, and a fluctuating electric field is set up between the internal and external electrodes which has sufficient energy to ionize the neon and cause the lamp to glow. When the pulsating signals cease the neon no longer ionizes, and the glow is extinguished.

The response of the neon lamp to the presence of the pulsating signals makes such an indicator circuit extremely useful in checking the operating condition of a circuit when trouble shooting. Thus, the one indicator shows that pentode 12 is operating properly, the +250 volt supply is available, and the clock pulses are present.

Further, the neon indicating device 10 also serves to trace system operation by indicating the logical condition of the first signal circuit 27 and the second signal circuit 28. If either of the circuits 27 or 28 is "off," the neon lamp remains extinguished; but, as shown above, when both circuits are "on" the neon lamp glows in response to the pulsating signals created by the clock pulses.

Assume now that amplifier 11 is modified as shown in Fig. 1a, so that the tube 12' normally conducts, and an A.-C. signal is selectively applied to the control grid to superimpose an A.-C. signal. With no A.-C. signal applied to the grid and only the D.-C. current flowing, no ionization of the neon occurs and the glow tube 10 remains extinguished. When the A.-C. signal is applied to the control grid, the anode potential of the tube 12' is caused to vary; and the neon ionizes to ignite the indicator lamp 10. Thus it is seen that the indicator is used as a discriminator to discriminate between the A.-C. and the D.-C. currents and provides an accurate indication of whether or not the anode of the tube 12' is being pulsed by the input signals at lead 18, which may be derived in the same manner as shown in Fig. 1.

Having therefore described the invention and its mode of operation, those features of novelty believed descriptive of the nature and scope of the invention are described with particularity in the appended claim.

What is claimed is:

A circuit comprising in combination a vacuum tube amplifier, said tube having at least a cathode, an anode and a control grid, said anode coupled to a source of positive potential through a load device, said cathode being coupled to substantially ground potential, a coincidence gate comprising a plurality of unidirectional current conducting devices each having an anode and a cathode, said cathodes of said unidirectional devices coupled to a source of positive potential and to said control grid, a clock pulse source coupled to the anode of one of said unidirectional devices, a signal voltage source coupled to the anode of each of said remaining unidirectional devices, a gaseous tube having an envelope containing electrodes, a metallic external shield electrode disposed about said envelope, said metallic electrode being at substantially ground potential, and a coupling between said anode of said vacuum tube and said internal electrodes of said gaseous tube for causing ionization of the gas in said gaseous tube when a pulsating current appears at said anode of said tube in response to coincidence of signals applied to said control grid through said unidirectional devices from said clock pulse source and said signal pulse source.

References Cited in the file of this patent
UNITED STATES PATENTS

| | | |
|---|---|---|
| 1,884,950 | Woodring | Oct. 25, 1932 |
| 1,965,188 | Hasenberg | July 3, 1934 |
| 2,068,741 | Geffcken | Jan. 26, 1937 |
| 2,135,726 | Mitchell | Nov. 8, 1938 |
| 2,222,784 | Schierl | Nov. 26, 1940 |
| 2,405,814 | Brannin | Aug. 13, 1946 |
| 2,479,964 | Pinkerton | Aug. 23, 1949 |
| 2,487,437 | Goldstein et al. | Nov. 8, 1949 |
| 2,654,042 | Clarke et al. | Sept. 29, 1953 |
| 2,679,617 | Mullaney | May 25, 1954 |
| 2,795,724 | Beeson | June 11, 1957 |
| 2,816,281 | Aronson | Dec. 10, 1957 |
| 2,825,000 | Beeson | Feb. 25, 1958 |
| 2,842,313 | Geisler | July 8, 1958 |
| 2,913,706 | Thorensen et al. | Nov. 17, 1959 |

FOREIGN PATENTS

| | | |
|---|---|---|
| 17,532 of 1913 | Great Britain | Apr. 2, 1914 |
| 388,516 | Great Britain | Mar. 2, 1933 |